UNITED STATES PATENT OFFICE.

MAX VON UNRUH, OF CHARLOTTENBURG, GERMANY.

MANUFACTURE OF INCANDESCENT BODIES FOR GAS-LIGHTS.

949,010. Specification of Letters Patent. Patented Feb. 15, 1910.

No Drawing. Application filed August 19, 1908. Serial No. 449,236.

*To all whom it may concern:*

Be it known that I, MAX VON UNRUH, chemist, a subject of the Emperor of Germany, residing at Grolmannstrasse 68, Charlottenburg, in the Empire of Germany, have invented certain new and useful Improvements in the Manufacture of Incandescent Bodies for Gas-Lights, of which the following is a specification.

The present invention relates to processes for manufacturing incandescing bodies for incandescent gas lighting and to the article produced thereby, the incandescing property of which depends on the use of the known mixture of the oxids of thorium and cerium.

The object of the invention is the production of an incandescing body which will be of a high degree of porosity and possess a high lighting power, which will be durable, and which will be capable of great resistance to shocks.

A further object of the invention is the production of the unburned incandescent body in such a manner that shrinkage of the same is obviated during the final burning, or as a result of such burning.

According to the present invention many objectionable properties of incandescent bodies as hitherto known are avoided.

The unburned incandescing body contains 8–15 per cent. of thorium acid in order that there will be no partial fusion of the mass. It contains, furthermore, 30–40 per cent. of oxid of magnesium in order to impart stability to the body. The addition of thorium oxid with the magnesium oxid has mainly the purpose of avoiding a partial fusion of the mass during the burning of the body. If thorium oxid is formed during the burning of the body from thorium nitrate alone, a fusion and shrinking of the body is caused, whereas practical experiments have shown that such fusion and shrinking are avoided if a certain amount of ready formed thorium oxid is present. The magnesium oxid assists the said effect of thorium oxid because it is fire-proof and gives a good support to the thorium oxid. The unburned incandescing body contains organic fibrous substances in a comminuted form, in order that during the ignition of the body interstices are formed therein, the interior surfaces of which consist of the oxids of thorium and cerium.

The process for manufacturing the incandescing body according to the present invention is as follows:—Organic fibrous substances, such, for example, as wool, cotton, ramie, cellulose, filtering paper, and fabrics of various kinds are impregnated with a solution of lighting salts, which is preferably a mixture of the nitrates of thorium and cerium. A suitable solution is composed of 800 grams of crystallized nitrate of thorium, and 45 grams of nitrate of cerium in 1500 grams of water. The fibrous substances are saturated with the said fluid, dried, and then comminuted as thoroughly as possible. Then 40–45 grams of the comminuted impregnated fibers are mixed with 30–40 grams of oxid of magnesium and 10–15 grams of oxid of thorium, then moistened either with water or with the lighting fluid, and thoroughly mixed. A binding agent is then added, which is preferably an organic substance having cementing qualities; either sugar, preferably inverted sugar, or gums or starch are suitable. All of the substances used in the process are then mixed thoroughly. Finally the bodies to be used as an incandescing medium are pressed, molded, or otherwise formed from the mass thus obtained, or fibers may be produced from the mass and be made into fabrics. As the last step, the body thus formed, for instance a mantle, is subjected to a suitable heat in order to destroy the organic substances and to transform the nitrates of thorium and cerium into the oxids of the said metals.

Having thus described my invention, what I claim is,

1. A body to be used for incandescent gas lighting consisting of comminuted organic fibrous substances impregnated with lighting salts, oxid of thorium, fireproof substances, and organic cementing substances, substantially as described.

2. A body to be used for incandescent gas lighting composed of comminuted organic fibrous substances, salts of cerium and thorium, oxid of thorium, fire proof substances, and organic cementing substances, substantially as described.

3. A body to be used for incandescent gas lighting consisting of a mixture of comminuted organic fibrous substances impregnated with nitrate of thorium and nitrate of cerium, with oxid of magnesium, oxid of thorium, and an organic cementing substance, substantially as described.

4. The herein described process for manufacturing incandescing bodies for incandescent gas lights, which consists in impregnating organic fibrous substances with lighting salts, comminuting the said fibrous substances, mixing them with a fire-proof substance and thorium oxid, moistening the mixture, adding an organic cementing substance, mixing the said substances, then forming the incandescing body and subjecting it to a heat sufficient to destroy the organic substances, substantially as described.

5. The herein described process for manufacturing incandescing bodies for incandescent lights, which consists in impregnating organic fibrous substances with nitrate of thorium and nitrate of cerium, comminuting the so-impregnated fibrous substances, mixing them with oxid of magnesium and oxid of thorium, moistening the mixture, adding an organic cementing substance, mixing the said substances, then forming the incandescing body and subjecting it to a heat sufficient for destroying the organic substances and converting the said nitrates into oxids of thorium and cerium, substantially as described.

In testimony whereof I affix my signature in presence of two witnesses.

MAX VON UNRUH.

Witnesses:
HENRY HASPER,
WOLDEMAR HAUPT.